United States Patent
Nakamura

(10) Patent No.: US 10,654,532 B2
(45) Date of Patent: May 19, 2020

(54) VEHICLE BODY STRUCTURE

(71) Applicant: HONDA MOTOR CO., LTD., Tokyo (JP)

(72) Inventor: Daisuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 16/155,974

(22) Filed: Oct. 10, 2018

(65) Prior Publication Data

US 2019/0111980 A1    Apr. 18, 2019

(30) Foreign Application Priority Data

Oct. 12, 2017   (JP) .................................. 2017-198902

(51) Int. Cl.
   *B62D 37/00*   (2006.01)
   *B62D 35/02*   (2006.01)
(52) U.S. Cl.
   CPC .................................. *B62D 35/02* (2013.01)
(58) Field of Classification Search
   CPC .................................................... B62D 35/02
   See application file for complete search history.

(56) References Cited

U.S. PATENT DOCUMENTS

| 5,462,324 | A | * | 10/1995 | Bowen | B60R 21/34 |
| | | | | | 293/15 |
| 9,957,000 | B1 | * | 5/2018 | Ehirim | B62D 35/02 |
| 2008/0108257 | A1 | * | 5/2008 | Gibbs | B60F 3/0007 |
| | | | | | 440/12.51 |
| 2013/0026790 | A1 | * | 1/2013 | Kakiuchi | B62D 35/02 |
| | | | | | 296/193.07 |
| 2016/0214662 | A1 | | 7/2016 | Emura | |
| 2017/0297637 | A1 | * | 10/2017 | Shinedling | B62D 35/02 |
| 2017/0305479 | A1 | * | 10/2017 | Caples | B62D 35/02 |
| 2018/0215424 | A1 | * | 8/2018 | Marmo | B62D 35/02 |

FOREIGN PATENT DOCUMENTS

| JP | 2005-199828 A | 7/2005 |
| JP | 2010-132208 A | 6/2010 |
| JP | 6025996 B2 | 11/2016 |
| JP | 2017-039355 A | 2/2017 |

OTHER PUBLICATIONS

Japanese Office Action dated Feb. 26, 2019, 3 pages.

* cited by examiner

*Primary Examiner* — Lori L Lyjak
(74) *Attorney, Agent, or Firm* — Rankin, Hill & Clark LLP

(57) ABSTRACT

A vehicle body structure includes a strake provided in the rear of a front end of a tire, and the strake includes a displacement part displaced to a direction coming close to the tire as going rearward. The strake as a whole is located between right and left tires and between the front end and a rear end of the tire. The strake is mounted on a rear suspension that suspends the tire from a vehicle body. The strake includes a horizontal part formed nearly horizontally on a lower end thereof. The rear suspension includes a cover overlapping with the rear suspension in an up-down direction, and the strake is provided on a lower surface of the cover and at a position on a rear side of a lower end of the cover. The strake is provided in front of a silencer that muffles exhaust from the vehicle body.

20 Claims, 3 Drawing Sheets

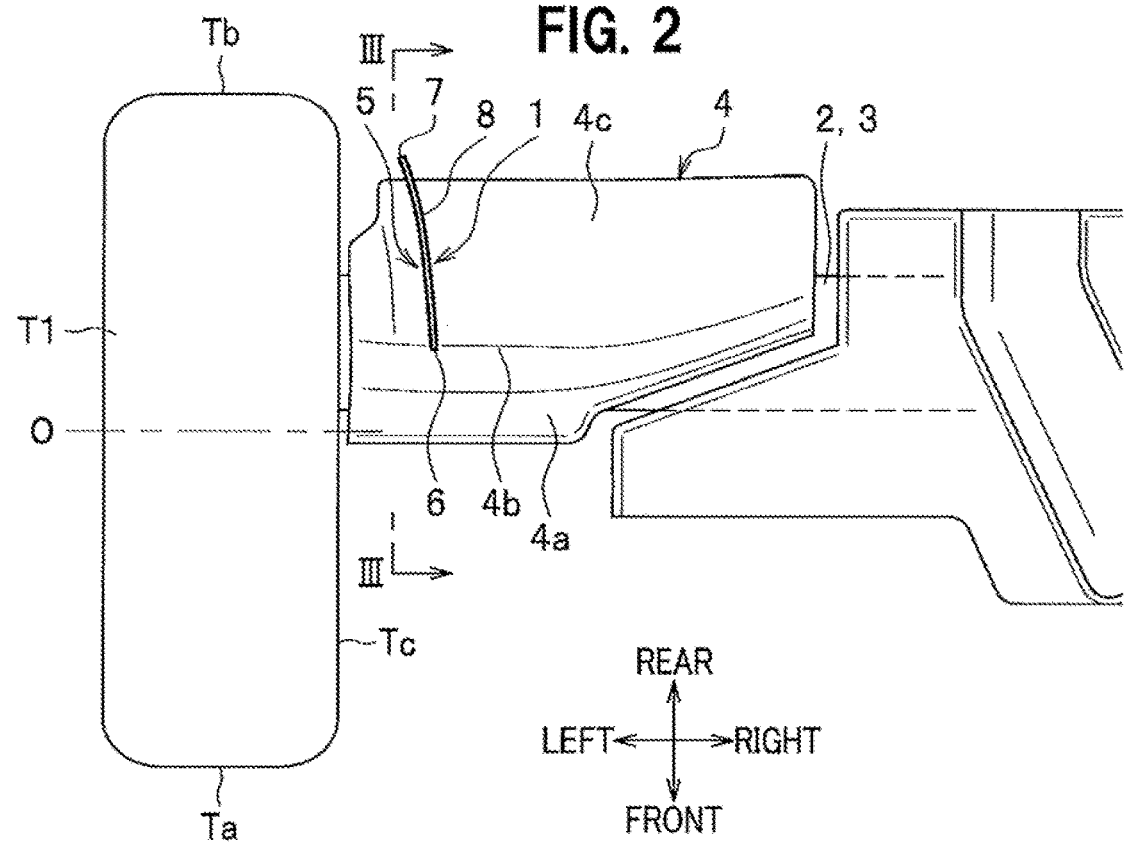
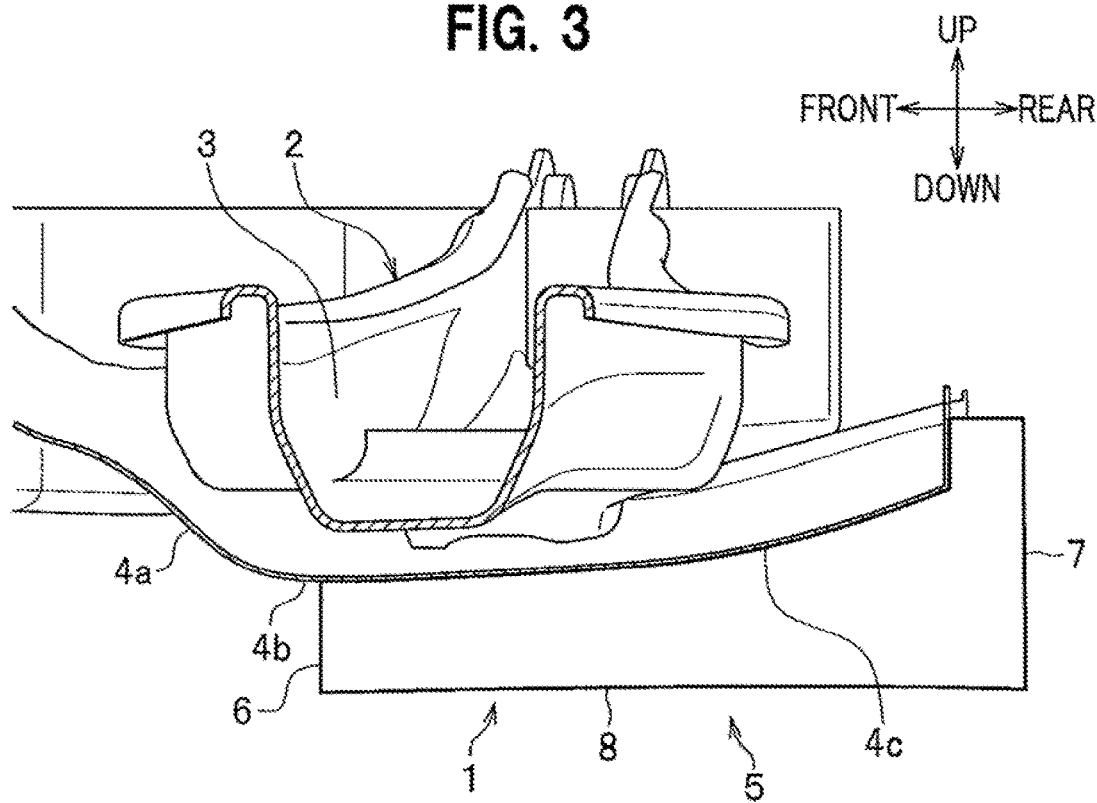

VEHICLE BODY STRUCTURE

CROSS-REFERENCE TO RELATED APPLICATION

This application is based upon and claims priority from the Japanese Patent Application No. 2017-198902, filed on Oct. 12, 2017, the entire contents of which are incorporated herein by reference.

BACKGROUND OF THE INVENTION

1. Field of the Invention

The present invention relates to a vehicle body structure of a vehicle such as an automobile.

2. Description of the Related Art

Known as conventional art is a vehicle body structure in which a strake is provided in front of a tire and the strake rectifies airflow so as not to allow air to flow into a wheel house, thereby decreasing air resistance (for example, see Patent document 1: Japanese Patent No. 6025996).

However, there has been a problem in that the air resistance is increased by airflow disturbed by the tire in the rear of the tire. The technique disclosed in Patent document 1 cannot solve the problem.

The present invention has therefore been made in view of the above problem, and an object of the invention is to provide a vehicle body structure capable of achieving a decrease in air resistance generated in the rear of a tire.

SUMMARY OF THE INVENTION

In order to solve the above problem, according to an aspect of the present invention, a vehicle body structure reflecting one aspect of the present invention includes a strake provided in the rear of a front end of a tire, wherein the strake includes a displacement part that is displaced to a direction coming close to the tire as going rearward.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

FIG. 2 is a bottom view showing the vicinity of a strake when viewing the vehicle body from below.

FIG. 3 is a sectional side elevation of a cover at a part on which the strake is mounted, and is a cross section view taken along the line III-III in FIG. 2.

DETAILED DESCRIPTION OF THE PREFERRED EMBODIMENTS

Hereinafter, description will be given of an embodiment in which a vehicle body structure according to the present invention is applied to the vicinity of a tire of a left side rear wheel, but the vehicle body structure according to the present invention can also be applied to the vicinity of a tire of a right side rear wheel, or of a tire on the front wheel side.

Referring to FIG. 2, a strake 1 is provided in the rear of a front end Ta of a tire T1 of the left side rear wheel. The strake 1 is mounted on a rear suspension 2 via a cover 4.

Figure 1:
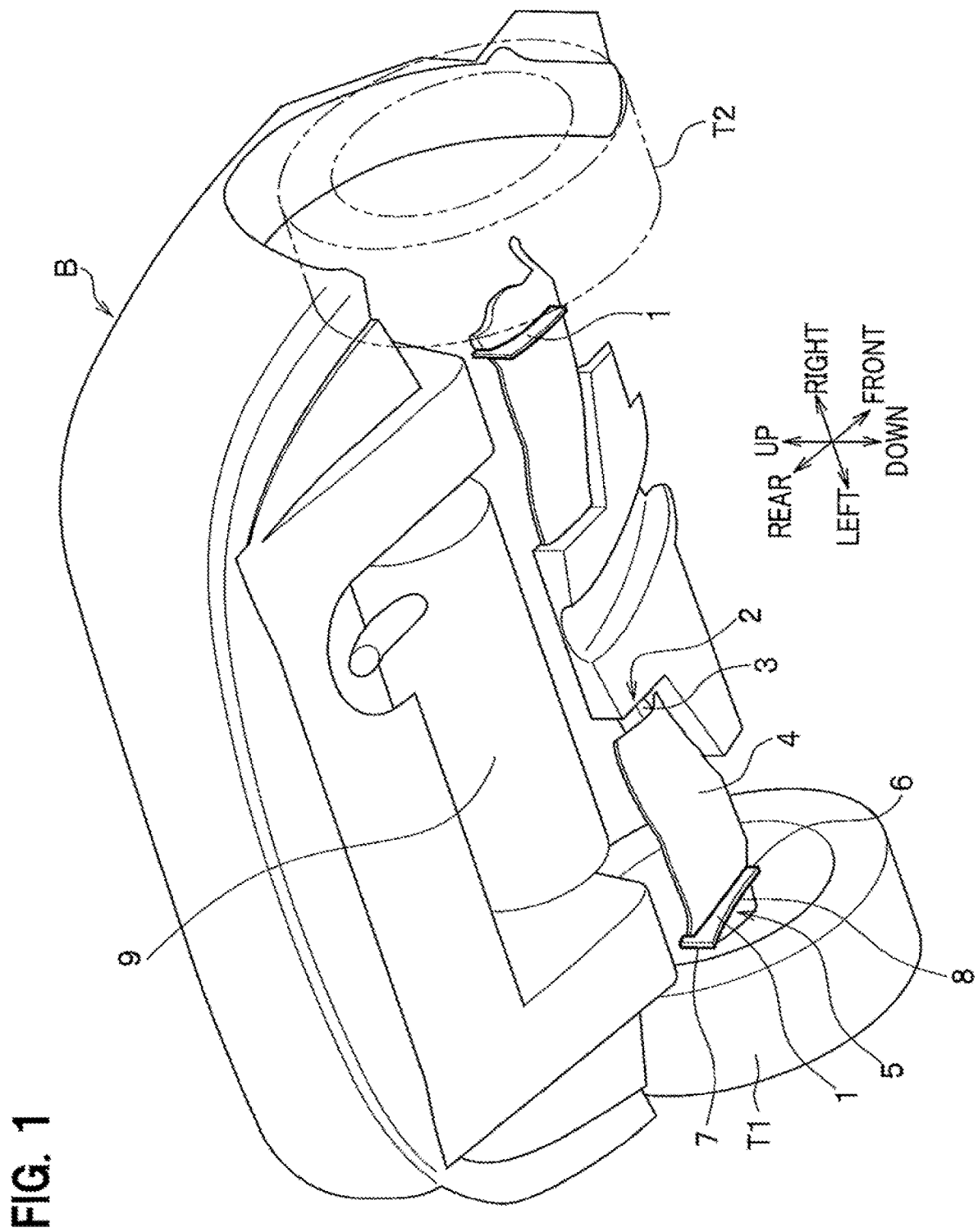
FIG. 1 is a perspective view showing the vicinity of a vehicle body rear part when looked up from an obliquely rear and lower side, to which a vehicle body structure according to an embodiment of the present invention is applied.

In FIG. 1 and FIG. 2, the rear suspension 2 is a member that suspends the tire T1 from a vehicle body B, and is provided with a torsion beam 3 extending in a vehicle width direction. The cover 4 is integrally mounted on a lower side of the torsion beam 3 so as to overlap with the torsion beam 3 when viewed in an up-down direction. The cover 4 has the form of nearly a rectangle elongated in substantially the vehicle width direction although it includes some cut-out sections on its edges when viewed in the up-down direction. The cover 4 has a function for protecting the torsion beam 3 from bounced stones or the like, and a function for rectifying airflow so as not to allow the airflow to hit on the torsion beam 3, thereby decreasing air resistance.

The strake 1 is a member that rectifies airflow, and includes a displacement part 5 that is displaced to a direction coming close to an inner side face Tc of the tire T1 as going rearward. In the present embodiment, the strake 1 is composed of a plate-shaped part that extends downward and vertically from a lower surface of the cover 4 in the vicinity of the inner side face Tc of the tire T1. The cover 4 and the strake 1 are composed of a resin material or a metallic material. Moreover, the cover 4 and the strake 1 may be formed integral with each other, or may be separate members that are assembled together.

The strake 1 as a whole is located between right and left tires T1, T2 (see FIG. 1) and between the front end Ta and a rear end Tb of the tire T1. The strake 1 has the displacement part 5 that extends nearly in the front-rear direction with a gently curved shape which projects inward in the vehicle width direction so as to gradually come close to the inner side face Tc of the tire T1 as going rearward over a range of a front end 6 to a rear end 7 of the strake 1. The strake 1 does not need to be extended to the vicinity of the front end Ta of the tire T1 as long as it has a rectifying function by which air flows toward the rear side of the tire T1. When the strake 1 is provided to lie between a tire axis O and the rear end Tb of the tire T1, both the rectifying function and downsizing can be secured.

The displacement part 5 may be formed into a curved shape which projects outward in the vehicle width direction, or may be formed into a linear shape. Moreover, the displacement part 5 does not need to be formed over the entire range in the front-rear direction of the front end 6 to the rear end 7 of the strake 1, and may be formed, for example, to partially include a plane parallel to the front-rear direction.

As shown in FIG. 3, the side cross-sectional shape of the cover 4 when viewed in the vehicle width direction includes, roughly, a front slope 4a that extends rearward and obliquely downward so as to cover the torsion beam 3 from the front side, a lower end 4b located at a position nearest to a road surface, of the cover 4, and a rear slope 4c that gently extends rearward and obliquely upward from the lower end 4b. The strake 1 is provided at a position on the rear side of the lower end 4b, and the front end 6 of the strake 1 is formed to extend downward from the lower end 4b. Therefore, almost the entirety of the strake 1 is formed to extend downward from the rear slope 4c. Note that the rear end 7 of the strake 1 is located to project a little rearward from a rear end of the rear slope 4c. The strake 1 has a horizontal part 8 formed nearly horizontally on a lower end thereof.

<Action>

Figure 4:
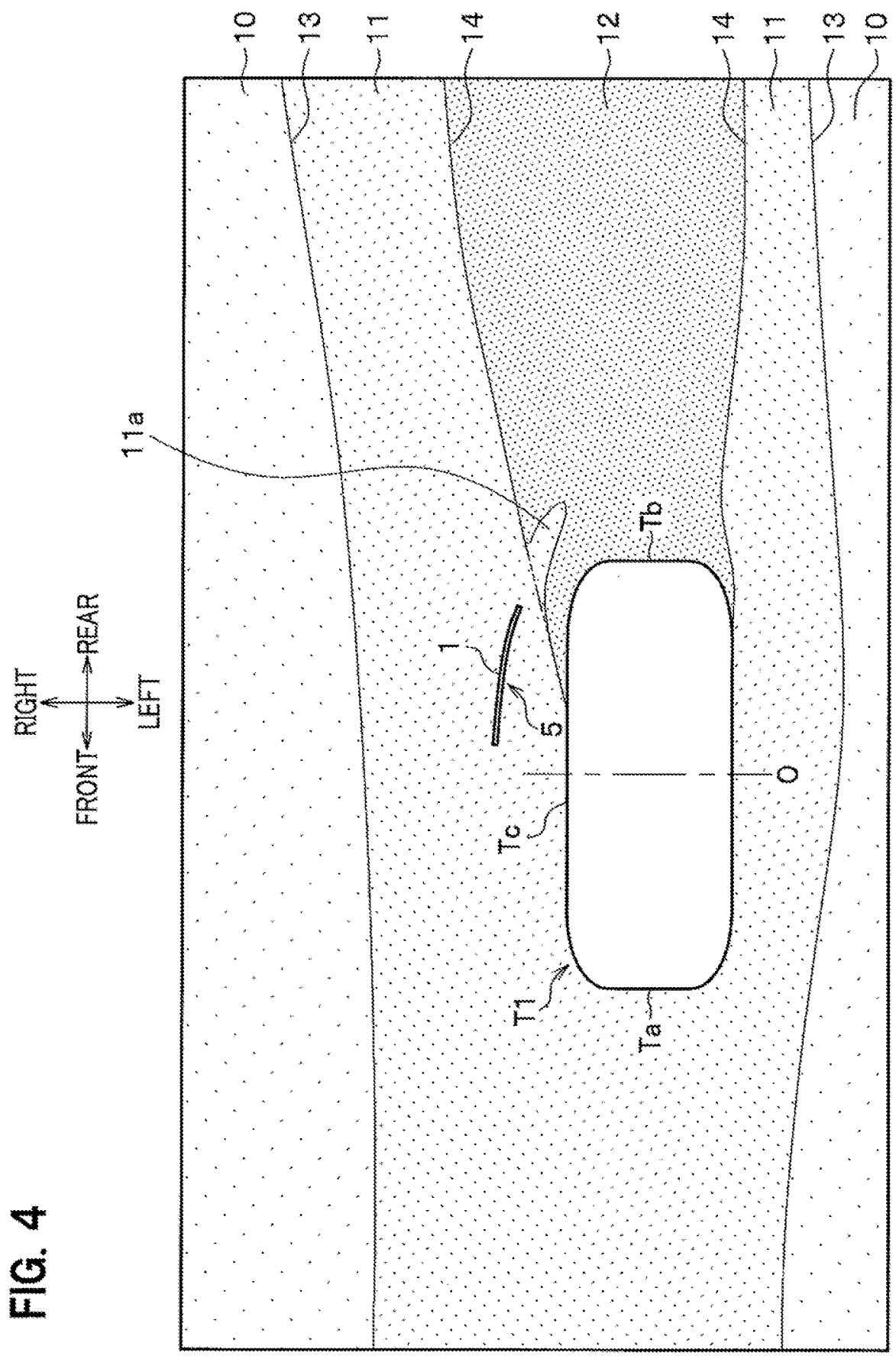
FIG. 4 is a diagram showing wind speed distribution in the vicinity of a vehicle body lower part during a wind speed test at the time of assumed traveling.

FIG. 4 shows wind speed distribution in the vicinity of a vehicle body lower part during a wind speed test at the time of assumed traveling in a vehicle provided with the strake 1. It can be seen from FIG. 4 that, roughly classifying, wind flowing near the center of the vehicle body and near the side face of the vehicle body belongs to a high speed area 10; wind flowing near both sides of the tire T1 belongs to a middle speed area 11; and wind flowing near the rear side of the tire T1 belongs to a low speed area 12. The strake 1 is located in the middle speed area 11.

Normally, a boundary 13 between the high speed area 10 and the middle speed area 11, and a boundary 14 between the middle speed area 11 and the low speed area 12 exhibit a smooth straight line or a gradually curved line. In contrast, focusing on the boundary 14 near the inner side face Tc of the tire T1, it can be seen that rectifying action exerted by the displacement part 5 of the strake 1 causes an area on the rear side of the rear end 7 of the strake 1 to be formed as a middle speed area 11a that protrudes from the boundary 14 locally toward the low speed area 12. The middle speed area 11a is formed to extend outward in the vehicle width direction, i.e., to extend toward a space close behind the tire T1 as going rearward from the boundary 14. This allows airflow in the low speed area 12 disturbed by the tire T1 to be rectified by airflow in the middle speed area 11a.

As described above, the vehicle body structure according to the present embodiment is configured so that it includes the strake 1 provided in the rear of the front end Ta of the tire T1, and the strake 1 includes the displacement part 5 displaced to the direction coming close to the tire T1 as going rearward. According to this configuration, the displacement part 5 causes air to effectively flow toward the rear side of the tire T1, thus allowing the airflow disturbed by the tire T1 to be rectified and air resistance to be decreased. When a strake (not shown) is also provided in front of the tire T1, air guided by the strake to flow into the inner side in the vehicle width direction of the tire T1 can be allowed to effectively flow toward the rear side, by the strake 1 according to the present embodiment.

Moreover, the vehicle body structure described above is configured so that the strake 1 as a whole is located between the right and left tires T1, T2 and between the front end Ta and the rear end Tb of the tire T1. According to this configuration, a flow speed of air becomes high in the vicinity of the center of the vehicle body, thus making it possible to effectively guide air having a fast flow speed toward the rear side of the tire T1 by guiding the airflow from the vicinity of the center of the vehicle body. Moreover, the strake 1 is provided on the inner side in the vehicle width direction of the tire T1, thereby making it possible to suppress an increase in size of the vehicle body B mainly in the vehicle width direction, as compared to a case where the strake is provided on the outer side in the vehicle width direction of the tire T1.

Moreover, the vehicle body structure described above is configured so that the strake 1 is mounted on the rear suspension 2 that suspends the tire T1 from the vehicle body B. According to this configuration, the tire T1 and the rear suspension 2 move in synchronization with each other, thus allowing the position of the strake 1 relative to the tire T1 to be kept constant at all times even if the tire T1 moves up and down, thereby making it possible to allow the predetermined rectifying function to be performed, and also to suppress contact of the strake 1 with a road surface.

Furthermore, the vehicle body structure described above is configured so that the strake 1 includes the horizontal part 8 formed nearly horizontally on the lower end thereof. According to this configuration, contact of the strake 1 with the road surface can be further suppressed by the horizontal part 8 even if the tire T1 moves up and down when the wheel gets over unevenness of the road surface.

Moreover, the vehicle body structure described above is configured so that the rear suspension 2 includes the cover 4 that overlaps with the rear suspension 2 when viewed in the up-down direction, and the strake 1 is provided on the lower surface of the cover 4 and at a position on the rear side of the lower end 4b of the cover 4. According to this configuration, a flow speed of air becomes highest in the vicinity of the lower end 4b where a distance between the road surface and the lower end 4b becomes narrowest, thus making it possible to achieve an improvement in rectifying effect by the strake 1.

In addition, the vehicle body structure described above may be configured so that it includes a silencer 9 that muffles exhaust from the vehicle body B, and the strake 1 is provided in front of the silencer 9. This configuration makes it possible to allow the strake 1 to hardly receive heat of the exhaust and to be hardly deformed or deteriorated.

The preferred embodiment of the present invention has been described above. Although the strake 1 is provided on the cover 4 in the described embodiment, the strake 1 may be provided, for example, directly on the rear suspension 2. Moreover, examples of a mounting part of the strake 1 on the rear suspension 2 include a trailing arm.

Although the embodiment of the present invention has been described and illustrated in detail, the disclosed embodiment is made for purposes of illustration and example only and not limitation. The scope of the present invention should be interpreted by terms of the appended claims.

DESCRIPTION OF REFERENCE SIGNS

1: Strake; 2: Rear suspension; 3: Torsion beam; 4: Cover; 4b: Lower end; 5: Displacement part; 6: Front end; 7: Rear end; 8: Horizontal part; 9: Silencer; T1, T2: Tire; Ta: Front end; Tb: Rear end; Tc: Inner side face

What is claimed is:

1. A vehicle body structure comprising a strake provided in the rear of a front end of a tire, wherein
   the strake includes a displacement part that is displaced to a direction coming close to the tire as going rearward.

2. The vehicle body structure according to claim 1, wherein
   the strake as a whole is located between right and left tires and between the front end and a rear end of the tire.

3. The vehicle body structure according to claim 1, wherein
   the strake is mounted on a rear suspension that suspends the tire from a vehicle body.

4. The vehicle body structure according to claim 2, wherein
   the strake is mounted on a rear suspension that suspends the tire from a vehicle body.

5. The vehicle body structure according to claim 3, wherein
   the strake includes a horizontal part that is formed nearly horizontally on a lower end of the strake.

6. The vehicle body structure according to claim 4, wherein
   the strake includes a horizontal part that is formed nearly horizontally on a lower end of the strake.

7. The vehicle body structure according to claim 3, wherein
the rear suspension includes a cover that overlaps with the rear suspension when viewed in an up-down direction, and
the strake is provided on a lower surface of the cover and at a position on a rear side of a lower end of the cover.

8. The vehicle body structure according to claim 4, wherein
the rear suspension includes a cover that overlaps with the rear suspension when viewed in an up-down direction, and
the strake is provided on a lower surface of the cover and at a position on a rear side of a lower end of the cover.

9. The vehicle body structure according to claim 5, wherein
the rear suspension includes a cover that overlaps with the rear suspension when viewed in an up-down direction, and
the strake is provided on a lower surface of the cover and at a position on a rear side of a lower end of the cover.

10. The vehicle body structure according to claim 6, wherein
the rear suspension includes a cover that overlaps with the rear suspension when viewed in an up-down direction, and
the strake is provided on a lower surface of the cover and at a position on a rear side of a lower end of the cover.

11. The vehicle body structure according to claim 1, wherein
the strake is provided in front of a silencer that muffles exhaust from the vehicle body.

12. The vehicle body structure according to claim 2, wherein
the strake is provided in front of a silencer that muffles exhaust from the vehicle body.

13. The vehicle body structure according to claim 3, wherein
the strake is provided in front of a silencer that muffles exhaust from the vehicle body.

14. The vehicle body structure according to claim 4, wherein
the strake is provided in front of a silencer that muffles exhaust from the vehicle body.

15. The vehicle body structure according to claim 5, wherein
the strake is provided in front of a silencer that muffles exhaust from the vehicle body.

16. The vehicle body structure according to claim 6, wherein
the strake is provided in front of a silencer that muffles exhaust from the vehicle body.

17. The vehicle body structure according to claim 7, wherein
the strake is provided in front of a silencer that muffles exhaust from the vehicle body.

18. The vehicle body structure according to claim 8, wherein
the strake is provided in front of a silencer that muffles exhaust from the vehicle body.

19. The vehicle body structure according to claim 9, wherein
the strake is provided in front of a silencer that muffles exhaust from the vehicle body.

20. The vehicle body structure according to claim 10, wherein
the strake is provided in front of a silencer that muffles exhaust from the vehicle body.

* * * * *